W. SEARCY.
NON-SKID BRAKE.
APPLICATION FILED FEB. 7, 1917.
1,249,525.
Patented Dec. 11, 1917.
2 SHEETS—SHEET 1.
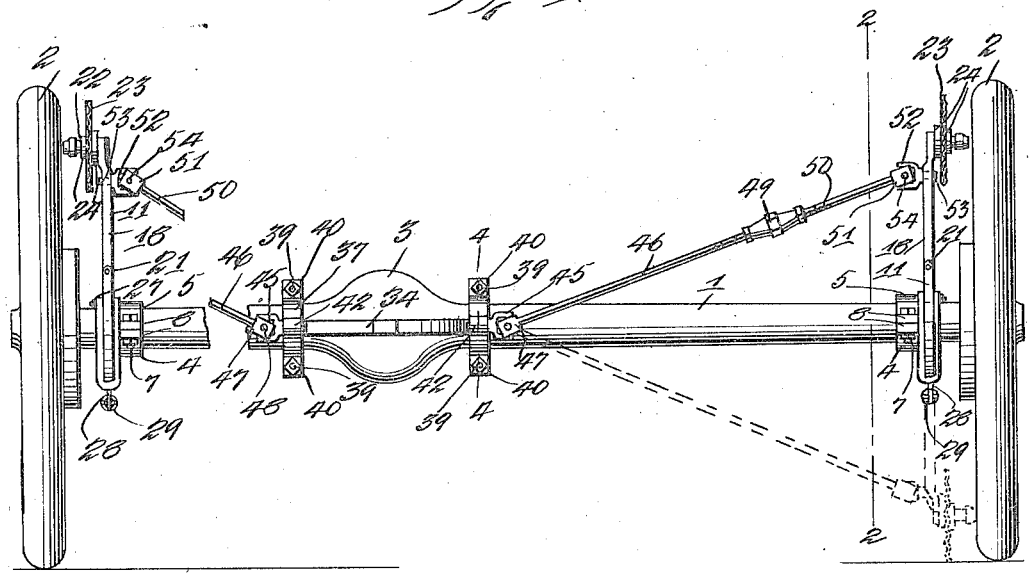
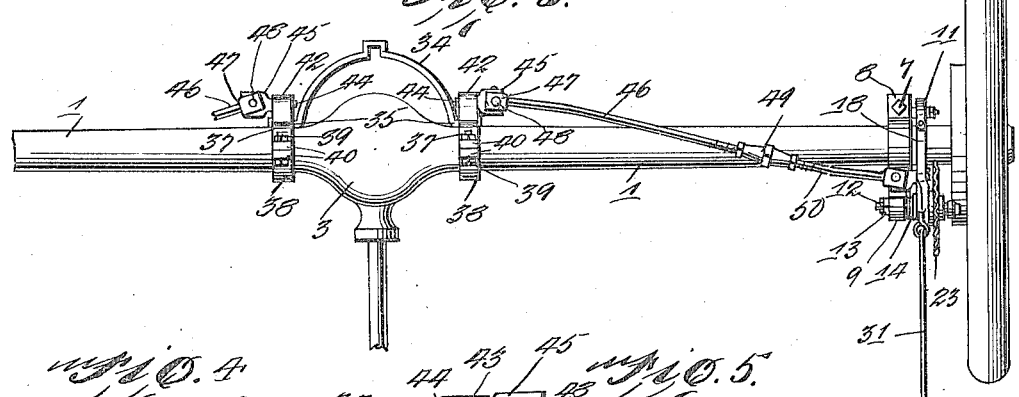
Inventor
W. Searcy
By E. E. Vrooman & Co.,
his Attorneys

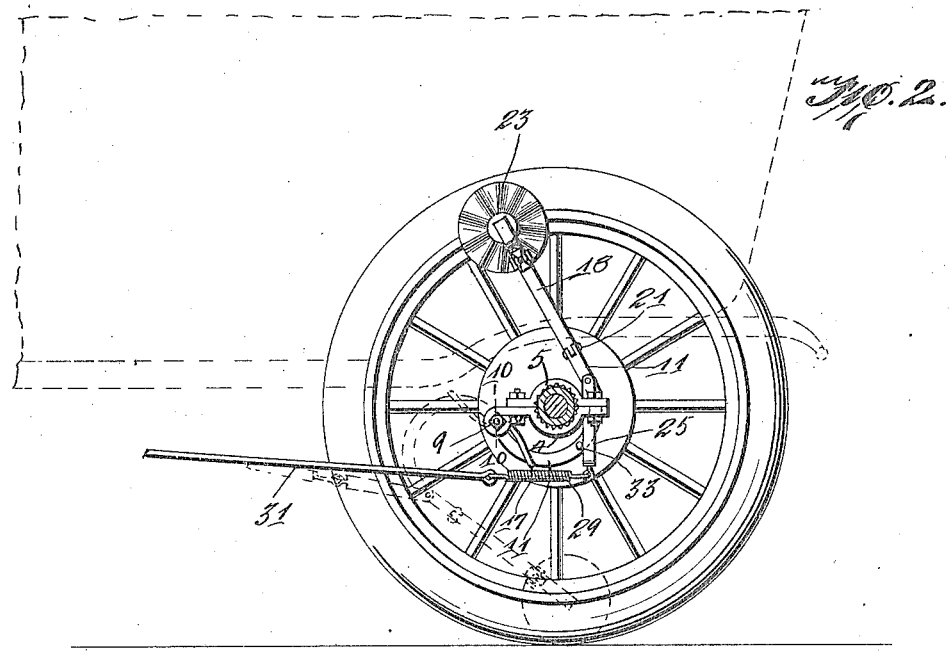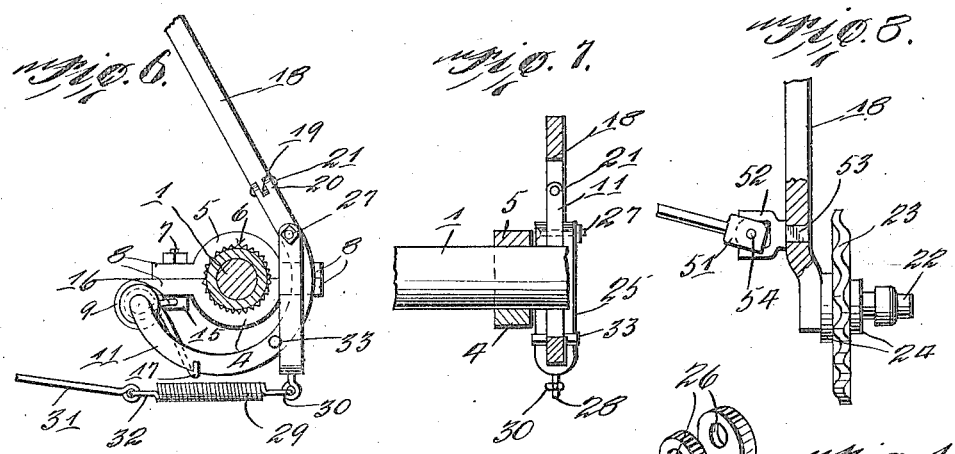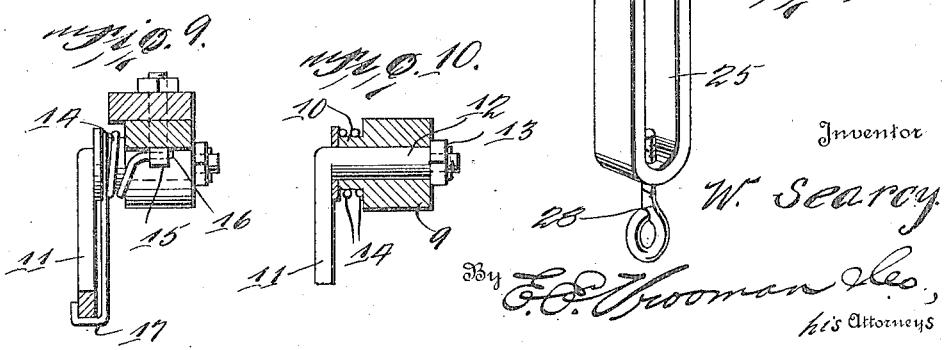

UNITED STATES PATENT OFFICE.

WALTER SEARCY, OF PLACERVILLE, CALIFORNIA.

NON-SKID BRAKE.

1,249,525.     Specification of Letters Patent.     Patented Dec. 11, 1917.

Application filed February 7, 1917. Serial No. 147,195.

*To all whom it may concern:*

Be it known that I, WALTER SEARCY, a citizen of the United States of America, residing at Placerville, in the county of Eldorado and State of California, have invented certain new and useful Improvements in Non-Skid Brakes, of which the following is a specification, reference being had therein to the accompanying drawing.

This invention relates to a non-skid brake for automobiles and has for its principal object the production of a structure which is adapted to hold the automobile against lateral or side movement with respect to the road when passing over uneven or slippery surfaces.

Another object of this invention is the production of a non-skid brake wherein the arm upon which the disk is mounted upon each side of the automobile is normally retained in an elevated position, although when desired the arm may be easily swung so as to throw the disk into engagement with the surface over which the automobile is passing for holding the automobile from skidding.

Another object of this invention is the production of a non-skid brake wherein a simple and efficient means is provided for swinging the disk into engagement with the ground.

A still further object of the invention is the production of a simple and efficient brace means for holding the arms in adjusted positions.

With these and other objects in view, this invention consists in general of certain novel combinations, constructions and arrangements of parts as will be hereinafter fully described and claimed.

In the accompanying drawings:

Figure 1 is a rear elevation of the non-skid brake, portions of the same being broken away upon one side of the automobile.

Fig. 2 is a vertical section taken on the line 2—2 of Fig. 1.

Fig. 3 is a top plan view of a portion of the non-skid brake.

Fig. 4 is a section taken on the line 4—4 of Fig. 1.

Fig. 5 is a sectional view through a portion of one of the clamps, illustrating the manner in which the same is connected to the bracing frame.

Fig. 6 is a sectional view through a portion of the device, illustrating the clamp upon which the arm is supported together with the lever in elevation.

Fig. 7 is a vertical section through the arm and lever-supporting clamp, illustrating portions of these elements in elevation.

Fig. 8 is an elevation partly in section of the outer end of one of the arms.

Fig. 9 is a vertical section through one end of the arm-supporting clamp, showing the lever in section.

Fig. 10 is a section taken on the line 10—10 of Fig. 2.

Fig. 11 is a detail perspective view of the stirrup.

Referring to the accompanying drawings by numerals it will be seen that the device is adapted to be used in connection with an ordinary axle casing 1 upon the ends of which the wheels 2 are carried, while the differential casing 3 is carried at the central portion of the axle casing 1.

The arm-supporting clamp comprises a primary section 4 and an auxiliary section 5 as shown clearly in Figs. 2 and 6. These sections 4 and 5 are milled upon their inner surfaces as shown at 6 so as to cause the milled surfaces 6 to bind snugly upon the axle casing 1 after the retaining bolts 7 have been passed through the projecting ends 8 of the sections 4 and 5 of the arm-supporting clamp. One of the projecting ends 8 of the primary section 4 is rolled to form a sleeve 9 upon which is formed a shoulder 10.

A lever 11 is substantially semi-circular in side elevation and has a bolt portion 12 formed thereon and extending to one side thereof as shown in Fig. 10. This bolt portion 12 extends through the sleeve 9 of the primary section 4 of the arm-supporting clamp and this bolt 12 carries upon its projecting end a nut 13 which holds the lever against accidental displacement. It is, of course, obvious that since the bolt 12 fits within the sleeve 9, the lever will be pivotally supported upon the arm-supporting clamp. A coil spring 14 is carried upon the shoulder 10 and this coil spring 14 has one end engaging the block 15 carried by one of the projecting ends 8 of the primary section 4 of the arm-supporting clamp, as shown at 16. The remaining end of the coil spring 14 is elongated and has a hook portion 17 engaging the outer periphery of the lever 11 as shown clearly in Figs. 6 and 9. It is obvious that as a consequence the lever 11 will normally be urged in one direction so as to cause its free end to be swung around the arm-supporting clamp and project thereabove, as shown in Fig. 6.

The arm 18 is provided with a tongue 19 which fits within the bifurcated end 20 of the lever 11 whereby a pivot pin 21 may pass through the bifurcated end 20 and the tongue 19 for pivotally mounting the arm 18 upon the lever 11. This arm 18 is provided with a stub axle 22 upon which the disk 23 is carried. The usual securing washers 24 are carried upon the stub axle 22 and it is obvious that if so desired, the disk 23 may be mounted upon ball bearings upon the axle 22 or in any other suitable usual manner for rotatably mounting the disks or wheels so as to cause the same to present the least resistance when rotated. Since the tension of the coil spring will normally retain the lever 11 in an elevated position, it will also be seen that the arm 18 will be retained in an elevated position, as shown clearly in Fig. 2. The disk 23 is, therefore, retained in an elevated position so as to be retained at a considerable distance above the ground when not in use. This disk 23 is, of course, formed of metal and is corrugated as shown clearly in Fig. 8 so as to cause the disk to more firmly grip the surface over which the automobile may be passing when this disk is thrown into engagement therewith. It is, of course, obvious that if so desired an ordinary flat disk may be employed for use when the automobile is passing over pavements, at which time it is not necessary to have a disk which will grip the surface as firmly as when the automobile is passing over ice or muddy roads.

The stirrup 25 is substantially U-shaped as shown in Fig. 11 and has openings 26 formed adjacent its outer end. This stirrup 25 is adapted to embrace the side portions of the lever 11 whereby a retaining bolt 27 may be passed through the lever 11 and through the openings 26 of the stirrup 25 for pivotally mounting this stirrup upon the lever. The screw-eye 28 is carried by the inner end of the stirrup 25 and inasmuch as this screw-eye is screwed into the stirrup, it is obvious that the eye 28 may be adjusted upon the stirrup when necessary. The coil spring 29 engages the screw-eye 28 as shown at 30, while the opposite end of this coil spring 29 is connected to the operating rod 31 as shown at 32.

When it is desired to swing the disk into engagement with the surface over which the automobile is passing, the rod 31 is pulled forwardly, thereby causing the spring 29 to pull forwardly upon the screw-eye 28. The stirrup 25 at this time will be bearing against the bearing lugs 33 carried by the lever 11 and, as a consequence, will pull downwardly upon the lever 11. Upon the downward movement of the upper end of the lever 11, the arm 18 will be swung downwardly so that the continued downward movement of the lever will swing the disk 23 into engagement with the ground over which the automobile is passing, as shown in dotted lines in Figs. 1 and 2. This disk will dig into the surface with which it is then engaging, so as to hold the automobile from skidding or side movement due to an uneven, slippery or slanting surface.

For the purpose of bracing the outer end of the arm or adjusting the same upon a different sized automobile, it is necessary to provide an adjustable brace therefor. The bracing frame 34 is substantially semi-circular as shown in Figs. 1 and 3, and has its ends 35 extending in the same plane with respect to each other, and these ends 35 have lugs 36 formed thereon. The bracing clamps used in conjunction with the bracing frame 34 comprise primary sections 37 and auxiliary sections 38. These sections 37 and 38 are retained upon the axle casing 1 as shown clearly in Figs. 3 and 4 by means of the bolts 39 which pass through the projecting ends 40 of the sections 37 and 38. The primary section 37 is provided with a notch 41 through which one of the ends 35 of the bracing frame 34 extends, as shown in Figs. 4 and 5. The lug 36 upon the free end 35 above referred to will bear upon the outer side portion of the section 37 of the bracing clamp for holding this bracing clamp from creeping along the axle casing 1 due to vibrations of the axle casing as the automobile is in use.

A block 42 is formed upon each of the primary sections 37 of the bracing clamps above referred to, and each block 42 is provided with a squared opening 43. The squared stem 44 of the yoke 45 is carried within the squared opening 43 and the stem 44 is shrunk or otherwise permanently secured to the primary section 37 so as to hold the yoke against accidental displacement. The brace rod 46 is also provided with a yoke 47 at one end which fits adjacent the yoke 45 so as to permit the yokes 45 and 47 to receive an ordinary universal joint 48 for pivotally connecting these yokes together. The opposite end of the brace rod 46 carries a turn buckle 49 from which extends a rod 50. This rod 50 is also provided with a yoke 51 fitting adjacent a yoke 52 carried by a stem 53 upon the arm 18. A universal joint 54 connects these yokes 51 and 52 together, thereby causing the arm 18 to be connected to the brace clamps connected to the brace frame. It is obvious that by the adjustment of the turn buckle 49 upon the brace rods 46 and 50, the position of the arm 18 may be adjusted as desired and retained in the position which it has assumed with respect to the side surfaces of the wheels 2 adjacent which the disk is carried. From this construction it is obvious that since the brace clamps are permanently retained in set positions upon the axle casing 1 by means of the bracing frame, the bracing rod and turn buckle will also retain the arm 18 in a set position inasmuch as the arm is adapted to move because of its pivotal connection with respect to the lever 11.

It is of course obvious that it is intended to have a lever arm and disk carried adjacent each end of the axle casing 1 and these elements are formed in all respects alike. Therefore, it is deemed necessary to describe the construction of only one of the devices since both devices are similarly constructed and operated.

From the foregoing description it will be seen that a very efficient non-skid brake has been provided which will positively hold an automobile against skidding or side movement simply by the forward movement of the operating rod 31 which will swing the disks from their normal position into engagement with the surface over which the automobile is passing for accomplishing the above mentioned function.

What is claimed is:—

1. In a device of the class described, the combination of a clamp, said clamp comprising a primary section and an auxiliary section, means for securing said sections together, a sleeve formed upon one of said sections, a shoulder formed adjacent said sleeve, a lever having a bolt formed thereon, said bolt being pivotally mounted within said sleeve, a coil spring carried upon said shoulder and engaging said lever for normally urging said lever in one direction, an arm carried by said lever, a disk carried by said arm, means for swinging said lever against the tension of said spring, whereby said arm will swing said disk into engagement with a supporting surface, said spring being adapted to return said lever and said arm to their normal positions upon the release of said means.

2. In a device of the class described, the combination of a clamp, said clamp comprising a primary section and an auxiliary section, means for securing said sections together, a sleeve formed upon one of said sections, a shoulder formed adjacent said sleeve, a lever having a bolt formed thereon, said bolt being pivotally mounted within said sleeve, a coil spring carried upon said shoulder, and engaging said lever for normally urging said lever in one direction, an arm carried by said lever, a disk carried by said arm, means for swinging said lever against the tension of said spring, whereby said arm will swing said disk into engagement with a supporting surface, said spring being adapted to return said lever and said arm to their normal positions upon the release of said means, and means for bracing said arm and holding the same in an adjusted position in a vertical plane.

3. In a device of the class described, the combination of a clamp, a lever pivotally mounted upon said clamp, a spring carried by said clamp and bearing upon said lever for normally urging said lever in one direction, an arm carried upon said lever, a disk carried by said arm, a stirrup pivotally mounted upon said lever, a screw-eye carried by said stirrup, a spring connected to said screw-eye, an operating rod connected to said last-mentioned spring whereby upon forward movement of said operating rod said spring will pull upon said stirrup for pulling said lever downwardly, thereby causing said arm to move said disk into engagement with a supporting surface, and said first-mentioned spring being adapted to return said lever and arm to their normal positions upon the release of said rod.

4. In a device of the class described, the combination of an arm, a disk carried by said arm, means for pivotally supporting said arm, means for normally retaining said arm in vertical plane, means for pivotally supporting said arm in a transverse plane, in a set position, means for swinging said arm downwardly for moving said disk into engagement with a supporting surface, a bracing frame, a bracing clamp retained in a set position by said frame, a plurality of bracing rods, means for adjustably connecting said bracing rods together, and means for pivotally connecting said bracing rods to said clamp and to said arm whereby said arm may be retained in an adjusted position.

5. In a device of the class described, the combination of an arm having a disk, means for supporting said arm, said arm being adapted to be swung into engagement with a supporting surface, a bracing frame having a flat end terminating in an upwardly-extending lug, a bracing clamp fitting upon said end and being retained against displacement by means of said lug, a block formed upon said clamp, bracing rods having an adjustable connection, means for pivotally supporting said bracing rods upon the block of said clamp and upon said arm, whereby said arm will be retained in an adjusted position.

In testimony whereof I hereunto affix my signature.

WALTER SEARCY.